US006847893B1

(12) United States Patent
Lupash

(10) Patent No.: US 6,847,893 B1
(45) Date of Patent: Jan. 25, 2005

(54) HORIZONTAL/VERTICAL EXCLUSION LEVEL DETERMINATION SCHEME FOR RAIM FAULT DETECTION AND EXCLUSION IMPLEMENTATION

(75) Inventor: Lawrence O. Lupash, Sunnyvale, CA (US)

(73) Assignee: Trimble Navigation, LTD, Sunnyvale, CA (US)

(*) Notice: Subject to any disclaimer, the term of this patent is extended or adjusted under 35 U.S.C. 154(b) by 213 days.

(21) Appl. No.: 10/350,390

(22) Filed: Jan. 22, 2003

(51) Int. Cl.[7] ............................ H04B 7/185; H04Q 7/20
(52) U.S. Cl. ...................... 701/213; 455/12.1; 455/427; 342/357.01; 342/353; 340/970; 340/990; 702/66
(58) Field of Search ................................ 701/213, 214, 701/215, 4; 375/371; 455/12.1, 427, 456.1; 342/357.01, 357.12, 357.06, 353, 357.08, 457; 340/970, 990, 995; 702/66

(56) References Cited

U.S. PATENT DOCUMENTS

| 6,205,377 | B1 | | 3/2001 | Lupash et al. | |
|---|---|---|---|---|---|
| 6,281,836 | B1 | | 8/2001 | Lupash et al. | |
| 6,667,713 | B2 | * | 12/2003 | Green et al. | ........... 342/357.02 |
| 6,711,478 | B2 | * | 3/2004 | Hilb | ................................ 701/8 |
| 2002/0077731 | A1 | * | 6/2002 | Hilb | ................................ 701/4 |
| 2002/0116098 | A1 | * | 8/2002 | Maynard | ....................... 701/13 |

OTHER PUBLICATIONS

Young, McGraw, Driscoll. "Investigation and Comparison of Horizontal Protection Level and Horizontal Uncertainty Level in FDE Algorithms", Proceedings of the 9th International Technical Meeting of the Satellite Division of the Institute of Navigation: ION GPS–96, Kansas City, MO, Sep. 17–20, 1996, pp. 1607–1614.

Kovach, "New User Equivalent Range Error (UERE) Budget for the Modernized Navstar Global Positioning System (GPS)", ION NTM 2000, Jan. 26–28, 2000, Anaheim, CA, pp. 550–573.

RTCA "Minimum Operational Performance Standards for Global Positioning System/Wide Area Augmentation System Airborne Equipment" RTCA–DO–229C, Nov. 28, 2001, pp. 1–21 RTCA, Inc. 1828 L Street, NW, Suite 805, Washington, DC 20086.

* cited by examiner

*Primary Examiner*—Thomas G. Black
*Assistant Examiner*—Tuan C To
(74) *Attorney, Agent, or Firm*—Boris G. Tankhilevich

(57) ABSTRACT

A method for satellite receiver autonomous integrity monitoring (RAIM) real time fault detection and exclusion implementation comprising the following steps: (1) continuously computing a horizontal protection level (HPL) and a vertical 32 protection level (VPL) associated with the effective configuration of real time measurement geometry; (2) if the HPL is less than or equal to the horizontal alert limit (HAL), and/or if the VPL is less than or equal to said vertical alert limit (VAL); declaring the RAIM detection function available; (3) continuously computing a horizontal exclusion level (HEL) and continuously computing a vertical exclusion level (VEL) associated with the effective configuration of real time measurement geometry; and (4) if the HEL is less than or equal to the HAL, and/or if the VEL is less than or equal to the VAL, declaring the RAIM fault exclusion function available.

18 Claims, 3 Drawing Sheets

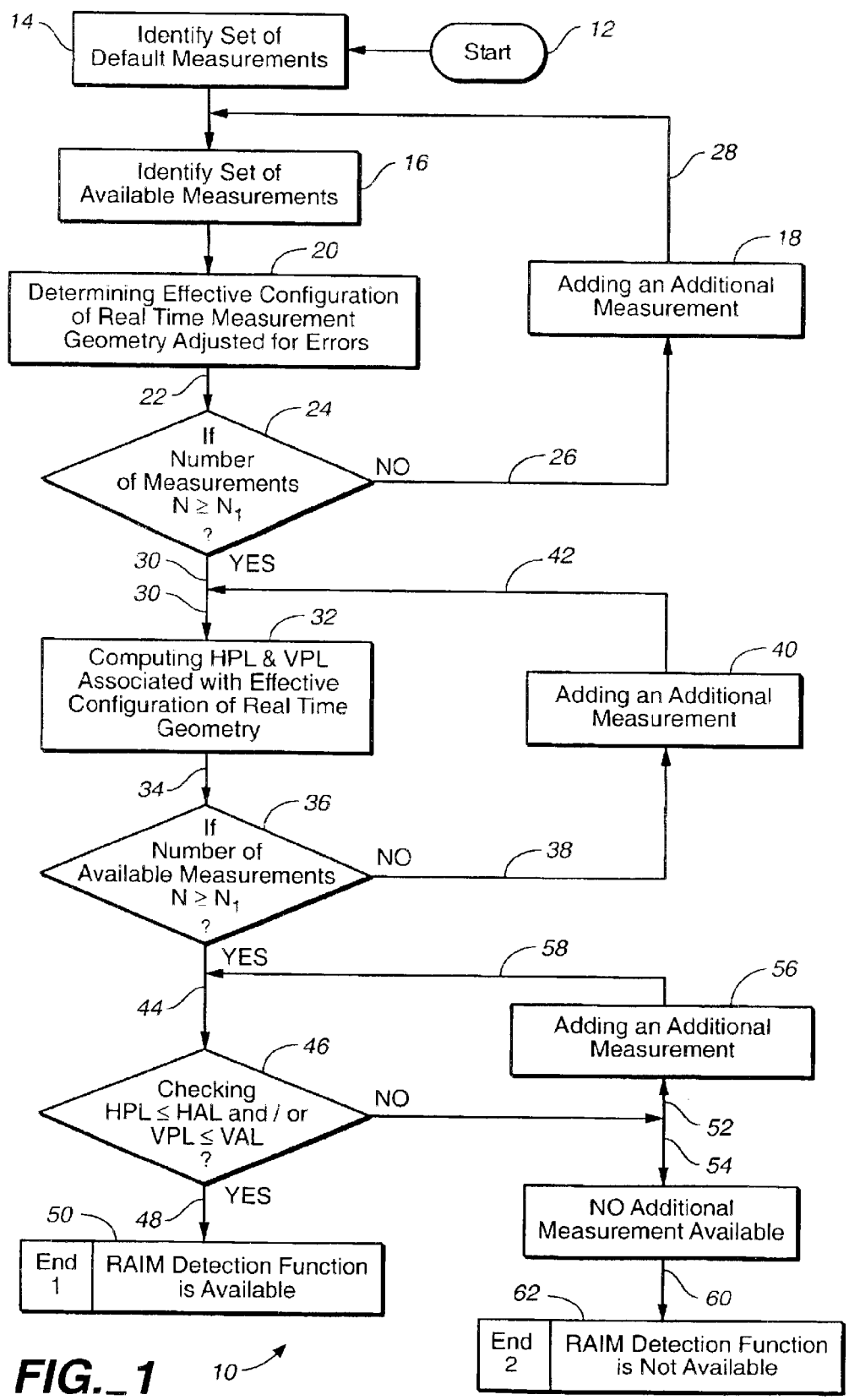
FIG._1

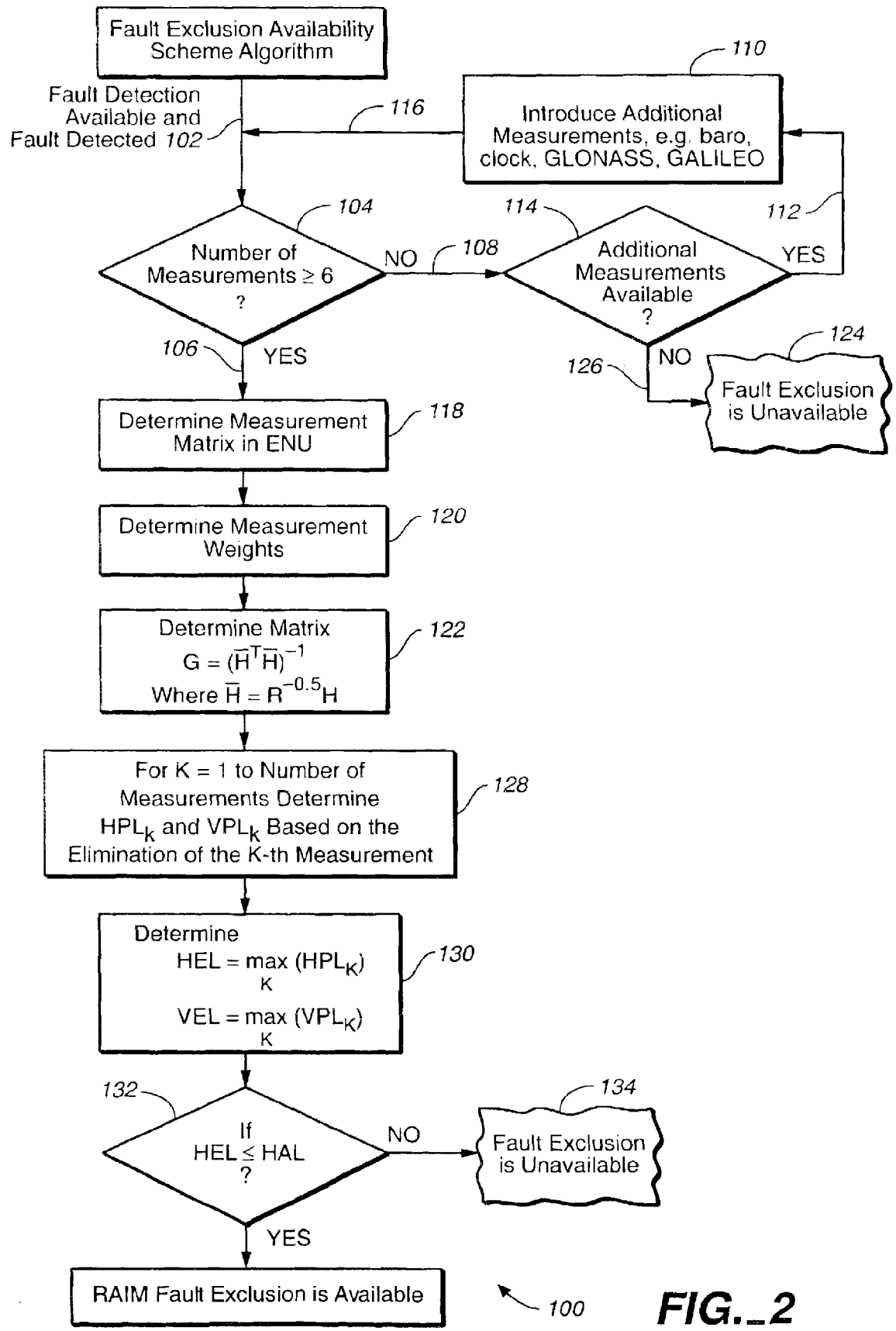
FIG._2

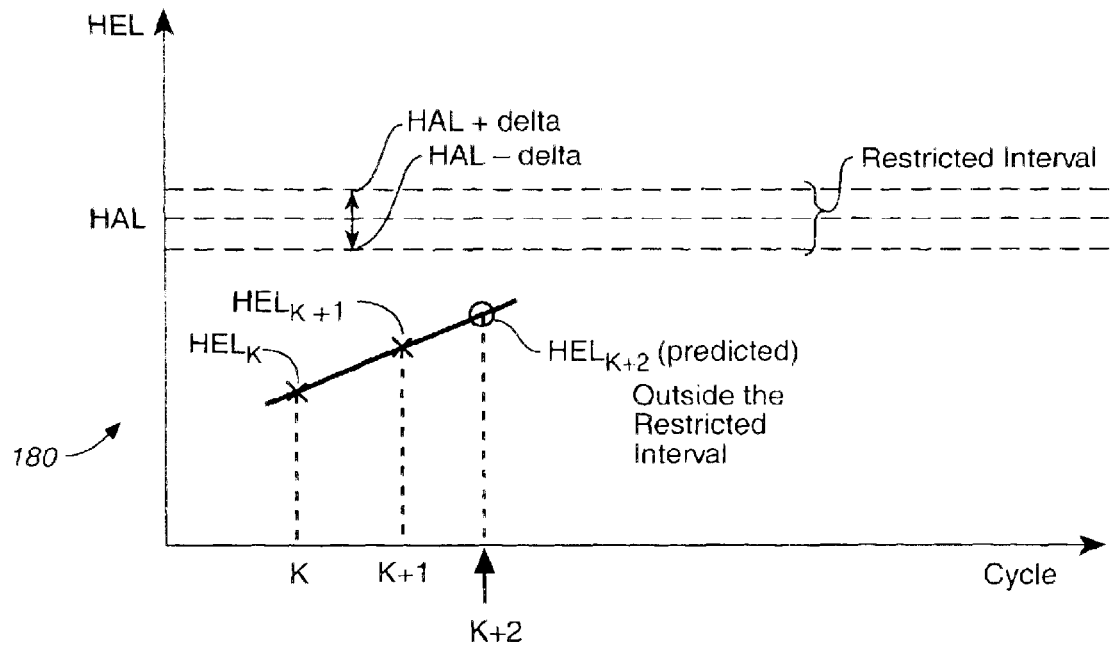
FIG._3A
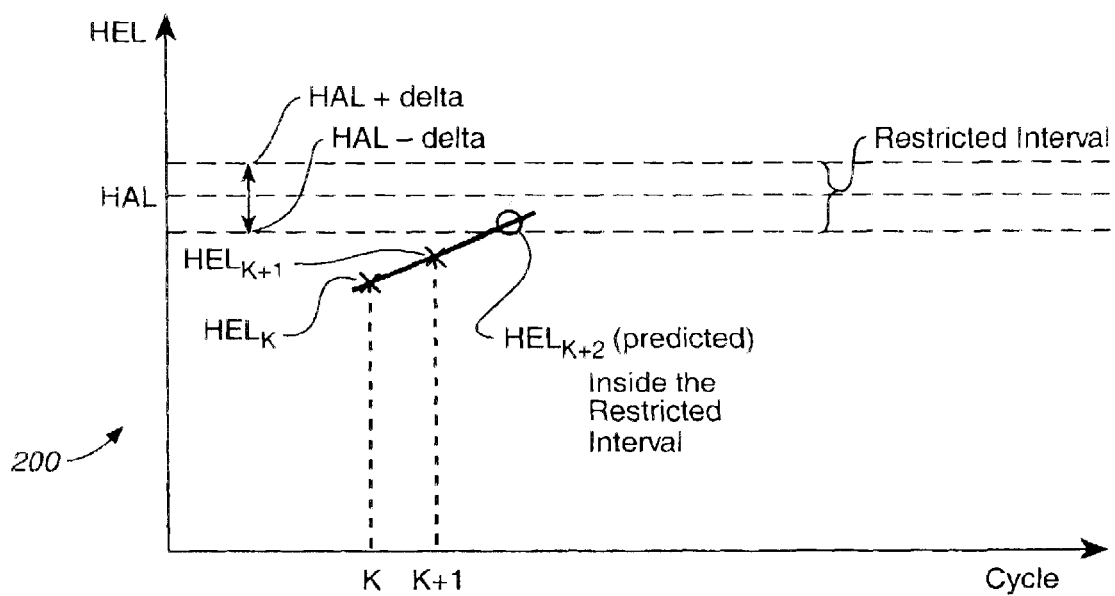
FIG._3B

HORIZONTAL/VERTICAL EXCLUSION LEVEL DETERMINATION SCHEME FOR RAIM FAULT DETECTION AND EXCLUSION IMPLEMENTATION

BACKGROUND OF THE INVENTION

1. Field of the Invention

The present invention is in the field of satellite navigation. More specifically, the present invention relates to the field of receiver autonomous integrity monitoring (RAIM) fault detection and exclusion implementation.

2. Discussion of the Prior Art

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudorandom noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, \ldots 24)$ is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given above discussion assumes that a satellite navigational system used for the navigation purposes is functioning properly. GPS satellites are designed to provide users with warnings of satellite malfunctions. However, sometimes, the warnings may take more than 5 minutes before the user is aware of a malfunction. Aviation applications require a more timely notification of a satellite failure condition. Thus, a means to independently monitor satellite integrity is required.

One of these means is receiver autonomous integrity monitoring (RAIM). The RAIM method is based on a self-consistency check among the available measurements. The RAIM consistency check uses redundant measurements as a means to determine GPS integrity. The discussion given below can be found in "Global Positioning System: Theory and Applications", Volume II, chapter 5, by Bradford W. Parkinson and James J. Spilker Jr., published by the American Institute of Aeronautics and Astronautics, Inc. in 1996.

There are two main approaches to RAIM (not considering several hybrid approaches). In the first main method, the snapshot scheme, only current redundant measurements are used for the self-consistency check. In the second main method, the averaging or filtering scheme, both past and present measurements are used in the RAIM decision.

The theoretical foundation for RAIM is statistical detection theory. Two hypothetical-testing questions are posed: (1) Does a failure exist? and (2) If so, which is the failed satellite? The basic assumption is that there is only one failed satellite at a time. Determination of which satellite has failed is more difficult than a simple failure detection, and it requires more measurement redundancy.

In a basic snapshot RAIM scheme the noisy redundant range-type measurements are available at a given sample point in time. It is convenient to use the six-satellites-in-view-case as an example, that is the number of satellites in view n=6. The generalization to n=5 or n>6 is fairly obvious.

In a range comparison method for six satellites there are six linearized over-determined equations in four unknowns. If there is no noise, one can solve the first four equations to obtain a solution that satisfies the first four equations. The resulting solution can be used to predict the remaining two measurements, and the predicted values can be compared with the actual measured values. If the two differences (residuals) are small, the detection algorithm detects "no failure". On the other hand, if either or both of the residuals are large, it declares "failure". The notion of "small" and "large" are defined by deciding whether the typical sample point lies inside or outside the decision boundary in the two-dimensional test statistic plane. This is the essence of the range comparison method.

In the least-squares-residuals RAIM method for the same six-in-view satellites example, one obtains the least squares "solution" for six equations in four unknowns. The least-squares solution can be used to predict the six measurements. Six residuals are then grouped together as a six-to-one vector in the measurement domain. The linear transformation takes the range measurement into the resulting residual vector. The sum of the squares of the residuals plays the role of the basic nonnegative scalar observable in the least-squares-residuals RAIM method. The positive semi-infinite real line can be partitioned into two parts, one for "no failure", and the other for "failure". The dividing point is called the threshold. In this method one can use a constant alarm-rate strategy by precalculating the thresholds (partitions) that yield the desired alarm rate for the various anticipated values of n. (In general, n is equal to the number of measurements). Then the real-time algorithm sets the threshold appropriately. For the zero-mean Gaussian assumption the sum of the squares of the residuals has an unnormalized chi-square distribution with (n−4) degrees of freedom. One can use chi-square statistics to find the threshold based on false alarm rate and missed detection rate for the n− number of measurements used. The sum of the squares of the residuals, which is a scalar, is used as the test statistic which is compared to the threshold. Thus, the least-squares-residuals RAIM method is easy to implement because its test statistic is a scalar, regardless of the number n of measurements used.

The RAIM parity method is more formal and less heuristic than either the range comparison method or the least-squares-residuals method. In this method, for the same six-in-view satellites example, the measurement vector is linearly transformed. The upper partitioned part of the transformation yields the usual least-squares solution. The lower partitioned is called the parity vector. For simple detection, one can obtain all the information about the parity vector by looking at its magnitude, or its magnitude squared. Thus, in the parity method, the test statistic for detection reduces to a simple scalar, as was the case with the least-squares-residuals method. The least-squares-residuals method and the parity method lead to identical observables, and with similar threshold settings, yield identical results. It can be shown, that the range-comparison space can be mapped to parity space. Thus, all three methods yield the same results.

Another RAIM implementation is the maximum separation of solution RAIM method. If there are n satellites in view, one can consider the n subset solutions obtained by omitting one satellite at a time from the full set. If a failure exists, the failed satellite is omitted from one of the subsets, and the solution thus obtained is declared a "good" solution. All other subsets contain the failed satellite, and they are in error to various degrees. If the pseudorange error in the failed satellite gradually increases with time, one would expect the subset solutions to begin to spread apart with time, and the maximum separation observed among the n solutions can be used as a measure of the solutions spread. The "good" solution remains near truth, because it does not contain the failed satellite. If there is no failure present, the solutions should remain grouped around the true position. Thus, the maximum observed solution separation in the horizontal plane can be used as a scalar and nonnegative test statistic. The "no-failure" decision is separated from the "failure" decision with some detection probability by the threshold that can be set by utilizing the relationship between the radial error and the radial-error-protection level. The detection probability varies with satellite geometry. However, this method is not implemented in the prior art satellite receivers.

In the constant-detection-rate/variable-protection-level method, a snapshot RAIM scheme differs significantly from the four methods described above. In this method, the parity vector is used as the basic test statistic, and a threshold is set to yield the desired constant alarm rate. To keep the detection probability constant, as the satellite geometry varies, the smallest radial error, or the protection radius, is used as a failure criterion. The protection radius can be calculated, in real time, on an essentially continuous basis. When the protection radius exceeds the specified alarm limit, the alarm should be triggered, which would indicate the inadequate satellite geometry. On the other hand, if the test statistic exceeds the threshold, the alarm also would be triggered. If this is the case, the alarm would be indicative of a satellite malfunction. In either of those situations, an airplane should be equipped with an alternative source of navigation when the satellite-based navigation fails. This is called a GPS supplementary navigation. One type of the supplementary navigation of an airplane (if the test statistic exceeds the threshold) can be performed by using a satellite-calibrated barometric altimeter data (baro-data), as fully disclosed in the U.S. Pat. No. 6,281,836, issued to Lupash et al. An airplane navigation system can perform the supplementary navigation by supplementing the GPS satellite data with the GLONASS-derived data, or with pseudolite-derived data, etc. Thus, if there are sufficient number of supplementary measurements available, the airplane navigation system could exclude the faulty GPS satellite data and still perform sufficiently precise navigation.

However, in order to isolate the faulty satellite data, the satellite navigation system at first has to determine if there are sufficient number of supplementary measurements available, so that the airplane navigation system could perform the RAIM fault exclusion function.

Thus, what is needed is develop a method to determine whether the RAIM fault detection and exclusion function (FDE) is available before the actual RAIM fault detection and exclusion process can be performed for the RAIM snapshot implementation.

SUMMARY OF THE INVENTION

To address the shortcomings of the available art, the present invention provides a method to determine whether the RAIM fault detection and exclusion function (FDE) is available before the actual RAIM fault detection and exclusion process can be performed for the RAIM snapshot implementation.

One aspect of the present invention is directed to a method for a satellite receiver autonomous integrity monitoring (RAIM) real time fault detection and exclusion implementation for each timing cycle of said satellite receiver. In one embodiment of the present invention, the method comprises the following steps: (a) identifying a default set of navigational measurements using a real time available GPS satellite constellation, and acquiring a plurality of GPS satellite signals by using a satellite receiver; (b) for each timing cycle of the satellite receiver continuously determining an effective configuration of real time measurement geometry adjusted for a normalized weights factor associated with different error sources; the effective configuration of real time measurement geometry adjusted for the normalized weights factor corresponds to the default set of navigational measurements; (c) if the number of default navigational measurements is greater than or equal to a first predetermined number, for each timing cycle of the satellite receiver continuously computing a horizontal protection level (HPL) and a vertical protection level (VPL) associated with the effective configuration of real time measurement geometry adjusted for the normalized weights factor; and (d) if the number of default navigational measurements is less than the first predetermined number, for each timing cycle of the satellite receiver adding an additional measurement to the default set of measurements and repeating the steps (a–c). The additional measurement is selected from the group consisting of: {GPS measurement, GLONASS measurement, GALILEO measurement, a baro measurement, a clock measurement, and a pseudolite measurement}.

In one embodiment of the present invention, the step (c) of continuously computing the horizontal protection level (HPL) and the vertical protection level (VPL) associated with the effective configuration of real time measurement geometry adjusted for the normalized weights factor further comprises the following steps: (e) if the number of default navigational measurements is greater than or equal to the first predetermined number, checking whether the horizontal protection level (HPL) is less than or equal to a horizontal alert limit (HAL), and/or checking whether the vertical protection level (VPL) is less than or equal to a vertical alert limit (VAL); and (f) if the number of default navigational measurements is less than the first predetermined number, adding an additional measurement to the set of available measurements, and repeating the step (e).

In one embodiment of the present invention, the step (e) of checking whether the horizontal protection level (HPL) is less than or equal to the horizontal alert limit (HAL), and checking whether the vertical protection level (VPL) is less than or equal to the vertical alert limit (VAL) further includes the following steps: (g) if the horizontal protection level (HPL) is less than or equal to the horizontal alert limit (HAL), and/or if the vertical protection level (VPL) is less than or equal to the vertical alert limit (VAL); declaring a receiver autonomous integrity monitoring (RAIM) detection function available based on the set of available measurements and declaring the set of available measurements as substantially sufficient; (h) if the horizontal protection level (HPL) is greater than the horizontal alert limit (HAL), and/or if the vertical protection level (VPL) is greater than the vertical alert limit (VAL), adding an additional measurement to the set of available measurements and repeating the step (g); and (i) if the horizontal protection level (HPL) is greater than the horizontal alert limit (HAL), and/or if the vertical protection level (VPL) is greater than the vertical alert limit (VAL), and if no additional measurement is available to add to the set of available measurements, declaring a receiver autonomous integrity monitoring (RAIM) detection function as not available and declaring the set of available measurements as not substantially sufficient.

In one embodiment of the present invention, if the receiver autonomous integrity monitoring (RAIM) detection function is available based on the set of available measurements, the step (g) of declaring the receiver autonomous integrity monitoring (RAIM) detection function available further includes the steps of: (k) if the number of available navigational measurements is greater than or equal to a second predetermined number, for each timing cycle of the satellite receiver, continuously computing a horizontal exclusion level (HEL) and continuously computing a vertical exclusion level (VEL) associated with the effective configuration of real time measurement geometry adjusted for the normalized weights factor; and (l) if the number of available navigational measurements is less than the second predetermined number, for each timing cycle of the satellite receiver adding an additional measurement to the set of available measurements and repeating the step k.

In one embodiment of the present invention, the step (k) of continuously computing the horizontal exclusion level (HEL) and continuously computing the vertical exclusion level (VEL) further includes the following steps: (k1) computing the horizontal exclusion level (HEL) by using a prior two-dimensional horizontal plane data obtained in the step (e) of checking whether the horizontal protection level (HPL) is less than or equal to the horizontal alert limit (HAL); (k2) computing the vertical exclusion level (VEL) by using a prior one-dimensional vertical data obtained in the step (e) of checking whether the vertical protection level (VPL) is less than or equal to the vertical alert limit (VAL); (k3) if the horizontal exclusion level (HEL) is less than or equal to the horizontal alert limit (HAL), and/or if the vertical exclusion level (VEL) is less than or equal to the vertical alert limit (VAL); declaring the RAIM fault exclusion function available; (k4) if the horizontal exclusion level (HEL) is greater than the horizontal alert limit (HAL), and/or if the vertical exclusion level (VEL) is greater than the vertical alert limit (VAL); adding an additional measurement to the set of available measurements; and repeating the steps (k1–k3); and (k5) if the horizontal exclusion level (HEL) is greater than the horizontal alert limit (HAL), and/or if the vertical exclusion level (VEL) is greater than the vertical alert limit (VAL), and if no additional measurement is available, declaring the RAIM fault exclusion function not available.

In one embodiment of the present invention, the step (k1) of computing the horizontal exclusion level (HEL) by using the prior data obtained in the step (e) further includes the following steps: (k1, 1) computing the horizontal exclusion level (HEL) by excluding one measurement at a time from the available set of measurements; (k1, 2) calculating a horizontal protection level ($HPL_k$) for each subset of measurements obtained from the available set of measurements with one excluded measurement; and (k1, 3) maximizing the ($HPL_k$) over all 'k' values. Herein, 'k' is an integer less than or equal to the number of available measurements.

In one embodiment of the present invention, the step (k2) of computing the vertical exclusion level (VEL) by using the prior data obtained in the step (e) further includes the following steps: (k2, 1) computing the vertical exclusion level (VEL) by excluding one measurement at a time from the available set of measurements; (k2, 2) calculating a vertical protection level ($VPL_i$) for each subset of measurements obtained from the available set of measurements with one excluded measurement; and (f2, 3) maximizing the ($VPL_i$) over all 'i' values. Herein, 'i' is an integer less than or equal to the number of available measurements.

Another aspect of the present invention is directed to a method for a satellite receiver autonomous integrity monitoring (RAIM) real time fault detection and exclusion implementation by performing at least one re-initialization cycle. In one embodiment of the present invention, the method comprises the following steps: (a) identifying a default set of navigational measurements using a real time available GPS satellite constellation, and acquiring a plurality of GPS satellite signals by using a satellite receiver; (b) performing a re-initialization cycle of the satellite receiver by computing and storing in a HEL/VEL database a plurality of HEL values and a plurality of VEL values for at least two consecutive timing cycles, wherein each HEL value corresponds to one timing cycle, and wherein each VEL value corresponds to one timing cycle; (c) determining and storing in the HEL/VEL database the difference between one HEL value and a selected threshold HAL for each re-initialization cycle; (d) determining and storing in the HEL/VEL database the difference between one VEL value and a selected threshold VAL for each re-initialization cycle; (e) computing and storing in the HEL/VEL database a plurality of updated HEL values and a plurality of updated VEL values corresponding to the updated set of measurements for at least two consecutive to timing cycles; each updated HEL value corresponding to one timing cycle; each updated VEL value corresponding to one timing cycle; (f) determining and storing in the HEL/VEL database the difference between one updated HEL value and a selected threshold HAL for each re-initialization cycle; and (g) determining and storing in the HEL/VEL database the difference between one updated VEL value and a selected threshold VAL for each re-initialization cycle.

In one embodiment of the present invention, the re-initialization should be performed if the default set of measurements has been updated to include an updated set of measurements by adding or eliminating at least one measurement selected from the group consisting of: {GPS measurement, GLONASS measurement, GALILEO measurement, a baro measurement, a clock measurement, and a pseudolite measurement}. In another embodiment of the present invention, the re-initialization should be performed if the user dynamics exceed a pre-determined dynamics, or if the user is pre-selecting a high dynamics option. In one more embodiment of the present invention, the re-initialization should be performed if a plurality of last stored HEL/VEL values includes a plurality of 'old' HEL/VEL values, that is if each 'old' HEL value was updated at least at an absolute timing coordinate greater than a predetermined timing coordinate, and/or if each 'old' VEL value was updated at least at an absolute timing coordinate greater than the predetermined timing coordinate. In an additional embodiment of the present invention, the re-initialization should be performed if a plurality of last computed HEL/VEL values includes a plurality of HEL values and a plurality of VEL values, and at least one last computed HEL value is greater than or equal to a selected threshold HAL; and/or at least one last computed VEL value is greater than or equal to a selected threshold VAL.

If a plurality of last computed HEL/VEL values includes a plurality of HEL values and a plurality of VEL values computed at a prior timing cycle; the process of prediction of a plurality of predicted HEL/VEL values based on the HEL/VEL database can be executed, wherein each predicted HEL value is extrapolated from at least two prior HEL values stored in the HEL/VEL database; and wherein each predicted VEL value is extrapolated from at least two prior VEL values stored in the HEL/VEL database.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 is a flowchart of the method of the present invention for a satellite receiver autonomous integrity monitoring (RAIM) real time fault detection and exclusion implementation for each timing cycle of the satellite receiver.

FIG. 2 depicts a flow chart of the method of the present invention to determine the fault exclusion availability.

FIG. 3A illustrates the curve of predicted $HEL_{k+2}$ values extrapolated from at least two prior $HEL_k$ and $HEL_{k+1}$ values stored in the HEL/VEL database by using a linear extrapolation. The predicted $HEL_{k+2}$ values are outside the restricted interval: [HAS-Δa; HAS+Δa], wherein Δa is the allowable error outside the restricted interval.

FIG. 3B depicts curve of predicted $HEL_{k+2}$ values extrapolated from at least two prior $HEL_k$ and $HEL_{k+1}$ values stored in the HEL/VEL database by using a linear extrapolation. The predicted $HEL_{k+2}$ values are inside the restricted interval: [HAS-Δb; HAS+Δb], wherein Δb is the allowable error inside the restricted interval.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 is a flowchart 10 of the method of the present invention for a satellite receiver autonomous integrity monitoring (RAIM) real time fault detection and exclusion implementation for each timing cycle of the satellite receiver. At the first step (14), a default set of navigational measurements is identified by using a real time available GPS satellite constellation, and a plurality of GPS satellite signals is acquired by using a satellite receiver. The brief description of the GPS was given above in the background section of the present invention.

In one embodiment, the satellite receiver (not shown) comprises Trimble 12-channel Force-5S GPS Receiver, and/or upgraded version of TA-12S GPS Receiver (FAA certified) including the real time proprietary software. In one embodiment, the real time proprietary software includes the disclosed below algorithm for (RAIM) real time fault detection and exclusion implementation for each timing cycle of the satellite receiver. In another embodiment, the satellite receiver includes both a GPS receiver and a GLONASS receiver. For reference, please see U.S. Pat. No. 5,923,287 "Combined GPS/GLONASS satellite positioning system receiver" issued to Lennen. In one more embodiment, the satellite receiver includes both a GPS receiver and a GALILEO receiver, because the GPS receiver will be capable of receiving the signal emanating from GALILEO system when it becomes operational.

The set of available measurements identified in the step (16) includes a default set of navigational measurements plus at least one more measurement selected from the group consisting of: {GPS measurement, GLONASS measurement, GALILEO measurement, a baro measurement, a clock measurement, and a pseudolite measurement}.

The real time additional GPS measurement is a based on a GPS satellite that was unavailable before and became available now because it became visible.

The real time additional GLONASS measurement is a based on a GLONASS satellite that was available before but was not used for the purposes of the present invention, or that was not available before, and became available now because it became visible.

Similarly, the real time additional GLONASS measurement is a based on a GLONASS satellite that was available before but was not used for the purposes of the present invention, or that was not available before, and became available now because it became visible. The brief description of the GLONASS was given above.

The real time additional GALILEO measurement is a based on a GALILEO satellite when GALILEO system becomes operational. GALILEO is a European satellite navigational system based on the same technology as GPS and provides a similar degree of precision. GALILEO complements GPS because the existence of two independent systems is of benefit to all users since they will be able to use the same receiver to receive both GPS and GALILEO signals.

The baro-measurement was disclosed by Lupash in U.S. Pat. No. 6,205,377, "Method for navigation of moving platform by using satellite data supplemented by satellite-calibrated baro data".

A clock measurement is a satellite based measurement that deals with only timing coordinate of the receiver. A pseudolite measurement is a position coordinates measurement that is based on a pseudolite. Pseudolites are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a pseudolite provides an additional ranging source to augment the GPS constellation.

Referring still to FIG. 1, at the next step (20) for each timing cycle of the satellite receiver an effective configuration of real time measurement geometry adjusted for a normalized weights factor (see discussion below) associated with different error sources is being continuously determined.

The error sources typically include the receiver noise, multipath errors, ionospheric errors, tropospheric errors, other technical errors (interchannel biases, PR quantization, mechanical errors, antenna phase center variations, and dynamic propagation errors). In addition, the error sources include the satellite-vehicle (SV)-based errors including: unmodeled SV accelerations, antenna phase center variations, deterministic clock frequency shifts (e.g., temperature related), and lever arm/pointing error interactions. For reference, please see the paper "New User Equivalent Range Error (UERTE) Budget for the Modernized Navstar GPS" given by Karl Kovach at the ION NTM 2000, 26–28 January 2000, Anaheim, Calif.

The effective configuration of real time measurement geometry that is adjusted for the normalized weights factor corresponds to the default set of navigational measurements, or to the set of available that includes the default set of navigational measurements plus at least one more measurement selected from the group consisting of: {GPS measurement, GLONASS measurement, GALILEO measurement, a baro measurement, a clock measurement, and a pseudolite measurement}. Please, see description above.

Referring still to FIG. 1, at the test condition (24) it is checked whether the number of available navigational measurements n is greater than or equal to a first predetermined number $n_1$: $n \geq n_1$. In one embodiment, the first predetermined number $n_1 \geq 5$. If the answer is Yes (logical arrow 30), at the next step (32) for each timing cycle of the satellite receiver a horizontal protection level (HPL) and a vertical protection level (VPL) associated with the effective configuration of real time measurement geometry adjusted for the normalized weights factor is being continuously computed. If, on the other hand, the number of default (available) navigational measurements is less than the first predetermined number $n_1$: $n<n_1$, the answer is NO (logical arrow 26). If this is then case, at the next step (18) for each timing cycle of the satellite receiver an additional measurement selected from the group consisting of: {GPS measurement, GLONASS measurement, GALILEO measurement, a baro measurement, a clock measurement, and a pseudolite measurement} is added to the default set of measurements. The steps (14–20) are preferably repeated.

Referring still to FIG. 1, after the horizontal protection level (HPL) and the vertical protection level (VPL) associated with the effective configuration of real time measurement geometry adjusted for the normalized weights factor have been continuously computed, the test condition (36) that is whether the number of available navigational measurements n is greater than or equal to the first predetermined number $n_1$: $n \geq n_1$ is checked again. If the answer is YES (logical arrow 44), at the next step (46) it is checked whether the horizontal protection level (HPL) is less than or equal to a horizontal alert limit (HAL), and whether the vertical protection level (VPL) is less than or equal to a vertical alert limit (VAL).

As was stated above, the present invention deals with a snapshot RAIM scheme. In the snapshot RAIM scheme, for instance, the parity vector is used as a variable in the least-square-residuals (LSR) method to form the basic test statistic, and a threshold is set to yield the desired constant alarm rate. To keep the detection probability constant, as the satellite geometry varies, the smallest radial error, or the HPL, is used as a failure criterion. The HPL can be calculated, in real time, on an essentially continuous basis. When the HPL exceeds the specified alarm limit, the alarm should be triggered, which would indicate the inadequate satellite geometry. On the other hand, if the test statistic exceeds the threshold, the alarm also would be triggered. There are two well-known quantities involved in the decision-making logic: the horizontal protection level (HPL) and the vertical protection level (VPL). A typical GPS receiver is capable of determining the horizontal protection level (HPL) and the vertical protection level (VPL). There are two specified alarm limits utilized: the horizontal alert limit (HAL), and the vertical alert limit (VAL). In the avionics applications, the HAL/VAL depends on the selected phase-of-flight. The HAL values are shown in the following Table I.

TABLE I

| Phase-of-Flight | HAL |
|---|---|
| Non-precision approach to the airport | 0.3 nautical mile = 555.6 meters. |
| Terminal | 1 nautical mile = 1,852 meters |
| En-Route | 2 nautical miles = 3,704 meters |
| Oceanic | 4 nautical miles = 7,408 meters |

VAL values are used mostly for precision approach landing category 1, 2, and 3.

Referring still to FIG. 1, if, on the other hand, the answer is NO (logical arrow 38), at the next step (40) an additional measurement selected from the group consisting of: {GPS measurement, GLONASS measurement, GALILEO measurement, a baro measurement, a clock measurement, and a pseudolite measurement} is added to the set of available measurements. The steps (32-40) are preferably repeated.

However, if the answer is YES (logical arrow 44), at the next step (46) it is checked whether the horizontal protection level (HPL) is less than or equal to the horizontal alert limit (HAL), and/or if the vertical protection level (VPL) is less than or equal to the vertical alert limit (VAL). If the answer is YES (logical arrow 48), a receiver autonomous integrity monitoring (RAIM) detection function is declared available (step 50) based on the set of available measurements and the set of available measurements is declared to be substantially sufficient for further computation of the RAIM fault detection and exclusion function (FDE). (See full description below).

If, on the other hand, the horizontal protection level (HPL) is greater than the horizontal alert limit (HAL), and/or if the vertical protection level (VPL) is greater than the vertical alert limit (VAL), at the next step (56) an additional measurement selected from the group consisting of: {GPS measurement, GLONASS measurement, GALILEO measurement, a baro measurement, a clock measurement, and a pseudolite measurement} is added to the set of available measurements, and steps (46–56) are preferably repeated. If the horizontal protection level (HPL) is greater than the horizontal alert limit (HAL), and/or if the vertical protection level (VPL) is greater than the vertical alert limit (VAL), and if no additional measurement is available to add to the set of available measurements, at the step (62) receiver autonomous integrity monitoring (RAIM) detection function is declared as not available and the set of available measurements is declared as not substantially sufficient for further computation of the RAIM fault detection and exclusion function (FDE).

Referring still to FIG. 1, if the receiver autonomous integrity monitoring (RAIM) detection function is declared available (step 50) based on the set of available measurements and the set of available measurements is declared to be substantially sufficient for further computation of the RAIM fault detection and exclusion function (FDE), for the purposes of the GPS-enabled navigation, in a snapshot RAIM scheme, a typical GPS receiver should perform the fault detection and exclusion (FDE) function. The fault detection and exclusion (FDE) function in a GPS receiver ensures the integrity of the navigation solution and prevents the display and use of hazardous and misleading information. Therefore, a typical GPS receiver also should have a capability of determining a horizontal/vertical exclusion level (HEL/VEL) which is a part of the fault detection and exclusion (FDE) function.

The computation of horizontal/vertical protection level (HPL/VPL) is well represented in technical literature. For reference, please see U.S. Pat. No. 6,281,836, "Horizontal/vertical protection level adjustment scheme for RAIM with baro measurements", and U.S. Pat. No. 6,205,377, "Method for navigation of moving platform by using satellite data supplemented by satellite-calibrated baro data".

On the other hand, the prior art related to HEL/VEL computation is relatively scarce and is based on the determination of HPL/VPL quantities for subsets of satellite geometry when one satellite is eliminated at a time from the available satellite list, and the HEL/VEL value is taken as the maximum over all determined HPL/VPL quantities. This prior art approach is computationally very inefficient especially when the number of available navigation satellites (or measurements) is large.

The present invention discloses a new and very efficient algorithm for the computation of HEL/VEL when a snapshot RAIM implementation is considered. The basic idea is to reduce the HEL/VEL computational burden by using the information already known from the preceding HPL/VPL computation. (Please, see full discussion below.)

FIG. 2 is a flow chart 100 of the method of the present invention to determine the fault exclusion availability. If the receiver autonomous integrity monitoring (RAIM) detection function is declared available based on the available set of measurements and the available set of measurements is declared as substantially sufficient (see discussion above), at the next step (104) the test condition is checked whether the number of available navigational measurements n is greater than or equal to a second predetermined number $n_2$ for each timing cycle of the satellite receiver: $n \geq n_2$. In one embodiment, the second predetermined number $n_2 = 6$.

If the answer is YES (logical arrow 106), the next step (not shown) is the step of continuously computation of a horizontal exclusion level (HEL) and of continuously computation of a vertical exclusion level (VEL) associated with the effective configuration of real time measurement geometry adjusted for the normalized weights factor. (Please, see discussion below.)

If, on the other hand, the number of available navigational measurements n is less than the second predetermined number $n_2$ for each timing cycle of the satellite receiver: $n < n_2$ and if an additional measurement is available (step 114), an additional measurement selected from the group consisting of: {GPS measurement, GLONASS measurement, GALILEO measurement, a baro measurement, a clock measurement, and a pseudolite measurement} is added to the set of available measurements (step 110). The steps (104–110) are preferably repeated.

If the answer to logical test 104 is YES, more specifically, the method of continuously computation of a horizontal exclusion level (HEL) and/or of continuously computation of a vertical exclusion level (VEL) associated with the effective configuration of real time measurement geometry adjusted for the normalized weights factor includes the following steps (not shown). More specifically (steps 118–134), the horizontal exclusion level (HEL) is computed by using a prior two-dimensional horizontal plane data obtained when the horizontal protection level (HPL) is checked against the horizontal alert limit (HAL), and the vertical exclusion level (VEL) is computed by using a prior one-dimensional vertical data obtained when the vertical protection level (VPL) is checked against the vertical alert limit (VAL).

Referring still to FIG. 2, at the step (118), the measurement matrix $H_{ENU}$ is determined in ENU (East North Up) coordinate system, wherein n is the number of measurements used in HEL/VEL computational process, $n \geq 6$, $H_{ECEP}$ is the measurement matrix (in ECEF frame) n by 4, with the last column made of "1" if the measurement is a satellite (or pseudolite) measurement, and of "0" if the measurement is a clock measurement. Herein, $T_{ECE}^{ENU}$ is the 4 by 4 modified transformation matrix from ECEF frame to ENU frame, the upper 3 by 3 sub-matrix contains the actual transformation from ECEF to ENU, the 4-th row and 4-th column element is 1, and other elements are zero, pbiasb is the normalized parity bias thresholds, constant array with different values for Standard Positioning System (SPS) (using a commercially available-C/A code) or Precise Positioning System (PPS) (using a classified P-code), depending on the number of available measurements. ECEF is an Earth Centered Earth Fixed coordinate system.

At step 120, the measurement weights are determined by calculating the matrix $R^{-0.5}$, which is a diagonal matrix including the inverse of the standard deviation (or square root of variance) associated with the n available measurements. It is important to mention that we assumed that the measurements are decorrelated.

Referring still to FIG. 2, at the step (122), the 4 by 4 symmetric matrix G is a covariance matrix associated with the selected n measurements. G is computed as follows: $G = (H_{barT}^* H_{bar})^{-1}$, where $H_{bar} = R^{-0.5} H$.

At step (128), a horizontal protection level ($HPL_k$) is calculated for each subset of measurements obtained from the available set of measurements with one excluded measurement; and a vertical protection level ($VPL_k$) is calculated for each subset of measurements obtained from the available set of measurements with one excluded measurement. At step 130, the ($HPL_k$) are maximized over all 'k' values; 'k' is an integer less than or equal to the number of available measurements; and the ($VPL_i$) are maximized over all 'i' values; 'i' is an integer less than or equal to the number of available measurements.

Referring still to FIG. 2, if the horizontal exclusion level (HEL) is less than or equal to said horizontal alert limit (HAL) (test 132), and/or if said vertical exclusion level (VEL) is less than or equal to said vertical alert limit (VAL) (test 132), declaring the RAIM fault exclusion function available.

If, on the other hand, the horizontal exclusion level (HEL) is greater than the horizontal alert limit (HAL), and/or if said vertical exclusion level (VEL) is greater than the vertical alert limit (VAL), adding an additional measurement selected from the group consisting of: {GPS measurement, GLONASS measurement, GALILEO measurement, a baro measurement, a clock measurement, and a pseudolite measurement} to set of available measurements (step 110), and repeating steps (118–132).

If the horizontal exclusion level (HEL) is greater than the horizontal alert limit (HAL), and/or if the vertical exclusion level (VEL) is greater than the vertical alert limit (VAL), and if no additional measurement is available, declaring the RAIM fault exclusion function not available (step 134). The new algorithm for the computation of HEL and VEL

| Inputs: | |
|---|---|
| n | number of measurements used in HEL/VEL computational process, $n \geq 6$. |
| $H_{ECEF}$ | measurement matrix in ECEF frame, n by 4, with the last column made of "1" if the measurement is a satellite measurement. |
| $R^{-0.5}$ | diagonal matrix containing the inverse of the standard deviation (or square root of variance) associated to the n measurements (the diagonal matrix can be stored as a vector). It is important to mention that we assumed that the measurements are decorrelated. |
| $T_{ECEF}^{ENU}$ | the 4 by 4 modified transformation matrix from ECEF frame to ENU frame, the upper 3 by 3 sub-matrix contains the actual transformation from ECEF to ENU the 4-th row and 4-th column element is 1, and other elements are zero. |
| pbiasb | normalized parity bias thresholds, constant array with different values for SPS or PPS, depending on the number of available measurements, and probability of false alarm and probability of missed detection. |

Algorithm:
1) Compute the measurement matrix in ENU frame: $H_{ENU}^T = T_{ECEF}^{ENU} * H_{ECEP}^T$,
2) Compute the normalized measurement matrix in ENU frame: $H_{bar} = R^{-0.5} * H_{ENU}$,
3) Compute the 4 by 4 symmetric matrix G as follows $G = (H_{bar}^T * H_{bar})^{-1}$,
4) For i=1 to n
   a) $H_i \leftarrow H_{bar}$, by eliminating the i-th row, $H_i$ is a (n-1) by 4 matrix;
   b) $h_i^{T \leftarrow}$ the eliminated i-th row of the matrix $H_{bar}$, $h_i$ is a 4 by 1 column vector;
   c) Compute the 4 by 1 vector: $Gh_i = G * h_i$,
   d) Compute the scalar: $d = 1. - h_i^T * Gh_i$, e) Compute the 4 by 4 symmetric matrix: $G_i = G + (Gh_i/d)*(Gh_i)^T$, f) Compute the 4 by (n−1) matrix: $A = G_i * H_i^T$, 5). For k=1 to (n−1):

g) Compute the k-th diagonal element of the (n−1) by (n−1) matrix $B = H_i * A$, by multiplying the elements of the k-th row of matrix $H_i$ by the elements of the k-th column of the matrix A, the resultant is the element B(k, k) of the (n−1) by (n−1) matrix B.

h) Determine the square of the k-th horizontal slope corresponding to the matrix $H_i$ as follows:

hislope2(k)=[A(1, k)*A(1, k)+A(2, k)*A(2, k)]/[1.−B(k, k)].

i) Determine the square of the k-th vertical slope corresponding to the matrix $H_i$ as follows:

vislope2(k)=[A(3, k)*A(3, k)]/[1.−B(k, k)].

End of the k index loop.

j) Determine maximum over all square of the horizontal slopes corresponding to the matrix $H_i$ as follows:

hislopemax2(i)=$\max_k$[hislope2(k)], k) Determine maximum over all square of the vertical slopes corresponding to the matrix $H_i$ as follows:

vislopemax2(i)=$\max_k$[vislope2(k)],

End of the i index loop,

6). Determine the maximum of all indices i of the square of the horizontal/vertical slope as follows:

hslopemax2=$\max_i$[hislopemax2(i)], and vslopemax2=$\max_i$[vislopemax2(i)].

7). Determine the HEL/VEL value as follows $$HEL=[sqrt(hslopemax2)]*pbiasb\,(n-5)$$

and $$VEL=[sqrt(vslopemax2)]*pbiasb(n-5)$$

Outputs:

1. HEL—horizontal exclusion level
2. VEL—vertical exclusion level.

Implementation Notes:

1. Steps 1 to 3 can be skipped if the matrix G is determined and stored during the computation of the HPL value.
2. At step 1) the multiplication should be done by using only the upper 3 by 3 sub-matrix corresponding to the transformation from ECEF frame to ENU frame. Note that the construction of the 4 by 4 transformation is not needed.
3. A small computational saving can be realized if we keep in mind that the 3 by 3 sub-matrix corresponding to the transformation from ECEF to ENU has an element that is 0.

Another aspect of the present invention is directed to a method for a satellite receiver autonomous integrity monitoring (RAIM) real time fault detection and exclusion implementation by performing at least one re-initialization cycle.

In one embodiment of the present invention, the re-initialization should be performed if the default set of measurements has been updated to include an updated set of measurements by adding or eliminating at least one measurement selected from the group consisting of: {GPS measurement, GLONASS measurement, GALILEO measurement, a baro measurement, a clock measurement, and a pseudolite measurement}.

In another embodiment of the present invention, the re-initialization should be performed if the user real time dynamics (the real time velocity vector and the real time acceleration vector) exceed a predetermined dynamics (predetermined velocity vector and predetermined acceleration vector), or if the user is pre-selecting a high dynamics option.

In one more embodiment of the present invention, the re-initialization should be performed if a plurality of last stored HEL/VEL values includes a plurality of 'old' HEL/VEL values, that is if each 'old' HEL value was updated at least at an absolute timing coordinate greater than a predetermined timing coordinate, and/or if each 'old' VEL value was updated at least at an absolute timing coordinate greater than the predetermined timing coordinate.

In an additional embodiment of the present invention, the re-initialization should be performed if a plurality of last computed HEL/VEL values includes a plurality of HEL values and a plurality of VEL values, and at least one last computed HEL value is greater than or equal to a selected threshold HAL; and/or at least one last computed VEL value is greater than or equal to a selected threshold VAL.

In one embodiment of the present invention, the method for RAIM/FDE implementation by performing at least one re-initialization cycle comprises the following steps (not shown): (a) identifying a default set of navigational measurements using a real time available GPS satellite constellation, and acquiring a plurality of GPS satellite signals by using a satellite receiver; (b) performing a re-initialization cycle of the satellite receiver by computing and storing in a HEL/VEL database a plurality of HEL values and a plurality of VEL values for at least two consecutive timing cycles, wherein each HEL value corresponds to one timing cycle, and wherein each VEL value corresponds to one timing cycle; (c) determining and storing in the HEL/VEL database the difference between one HEL value and a selected threshold HAL for each re-initialization cycle; (d) determining and storing in the HEL/VEL database the difference between one VEL value and a selected threshold VAL for each re-initialization cycle; (e) computing and storing in the HEL/VEL database a plurality of updated HEL values and a plurality of updated VEL values corresponding to the updated set of measurements for at least two consecutive timing cycles; each updated HEL value corresponding to one timing cycle; each updated VEL value corresponding to one timing cycle; (f) determining and storing in the HEL/VEL database the difference between one updated HEL value and a selected threshold HAL for each re-initialization cycle; and (g) determining and storing in the HEL/VEL database the difference between one updated VEL value and a selected threshold VAL for each re-initialization cycle.

In one embodiment of the present invention, the computation of HEL/VEL is executed by using the algorithm and logic disclosed above.

In one embodiment of the present invention, if a plurality of last computed HEL/VEL values includes a plurality of HEL values and a plurality of VEL values computed at a prior timing cycle, the process of prediction of a plurality of predicted HEL/VEL values based on the HEL/VEL database can be executed, wherein each predicted HEL value is extrapolated from at least two prior HEL values stored in the HEL/VEL database; and wherein each predicted VEL value is extrapolated from at least two prior VEL values stored in the HEL/VEL database.

In one embodiment of the present invention, FIG. 3A illustrates the curve 180 of predicted $HEL_{k+2}$ values extrapolated from prior $HEL_k$ and $HEL_{k+1}$ values stored in the HEL/VEL database by using a linear extrapolation. The predicted $HEL_{k+2}$ values are outside the restricted interval:

[HAS-Δa; HAS+Δa], wherein Δa is the allowable error outside the restricted interval. Similarly (not shown), in one embodiment of the present invention, the predicted $VEL_{i+2}$ values can be extrapolated from prior $VEL_i$ and $VEL_{i+1}$ values stored in the HEL/VEL database by using a linear extrapolation, whereas the predicted $VEL_{i+2}$ values are outside the restricted interval: [VAS-δa; VAS+δa], wherein δa is the allowable error outside the restricted interval.

In another embodiment of the present invention, FIG. 3B depicts curve of predicted $HEL_{k+2}$ values extrapolated from prior $HEL_k$ and $HEL_{k+1}$ values stored in the HEL/VEL database by using a linear extrapolation. The predicted $HEL_{k+2}$ values are inside the restricted interval: [HAS-Δb; HAS+Δb], wherein Δb is the allowable error inside the restricted interval. If the extrapolated value is within the restricted interval, the extrapolation process is stopped and the computation is re-initialized.

Similarly (not shown), in one embodiment of the present invention, the predicted $VEL_{i+2}$ values can be extrapolated from prior $VEL_i$ and $VEL_{i+1}$ values stored in the HEL/VEL database by using a linear extrapolation, whereas the predicted $VEL_{i+2}$ values are inside the restricted interval: [VAS-δb; VAS+δb], wherein δb is the allowable error inside the restricted interval. If the extrapolated value is within the restricted interval, the extrapolation process is stopped and the computation is re-initialized The extrapolation can be also performed by using a cubic extrapolation, a spline prediction method, or a fuzzy logic method.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for a satellite receiver autonomous integrity monitoring (RAIM) real time fault detection and exclusion implementation for each timing cycle of said satellite receiver; said method comprising the steps of:

(a) identifying a default set of navigational measurements using a real time available GPS satellite constellation, and acquiring a plurality of GPS satellite signals by using a satellite receiver;

(b) for each timing cycle of said satellite receiver continuously determining an effective configuration of real time measurement geometry adjusted for a normalized weights factor associated with different error sources; said effective configuration of real time measurement geometry adjusted for said normalized weights factor corresponds to said default set of navigational measurements;

(c) if said number of default navigational measurements is greater than or equal to a first predetermined number, for each timing cycle of said satellite receiver continuously computing a horizontal protection level (HPL) and a vertical protection level (VPL) associated with said effective configuration of real time measurement geometry adjusted for said normalized weights factor; and (d) if said number of default navigational measurements is less than said first predetermined number, for each timing cycle of said satellite receiver adding an additional measurement to said default set of measurements and repeating said steps (a–c); wherein said additional measurement is selected from the group consisting of: {GPS measurement, GLONASS measurement, GALILEO measurement, a baro measurement, a clock measurement, and a pseudolite measurement}.

2. The method of claim 1, wherein said step (c) of continuously computing said horizontal protection level (HPL) and said vertical protection level (VPL) associated with said effective configuration of real time measurement geometry adjusted for said normalized weights factor; further comprising the steps of:

(e) if said number of available navigational measurements is greater than or equal to said first predetermined number, checking whether said horizontal protection level (HPL) is less than or equal to a horizontal alert limit (HAL), and checking whether said vertical protection level (VPL) is less than or equal to a vertical alert limit (VAL); and (f) if said number of default navigational measurements is less than said first predetermined number, adding an additional measurement to said set of available measurements, wherein said additional measurement is selected from the group consisting of: {GPS measurement, GLONASS measurement, GALILEO measurement, a baro measurement, a clock measurement, and a pseudolite measurement}, and repeating said step (e).

3. The method of claim 2, wherein said step (e) of checking whether said horizontal protection level (HPL) is less than or equal to said horizontal alert limit (HAL), and checking whether said vertical protection level (VPL) is less than or equal to said vertical alert limit (VAL) further includes the steps of:

(g) if said horizontal protection level (HPL) is less than or equal to said horizontal alert limit (HAL), and/or if said vertical protection level (VPL) is less than or equal to said vertical alert limit (VAL); declaring a receiver autonomous integrity monitoring (RAIM) detection function available based on said set of available measurements and declaring said set of available measurements as substantially sufficient;

(h) if said horizontal protection level (HPL) is greater than said horizontal alert limit (HAL), and/or if said vertical protection level (VPL) is greater than said vertical alert limit (VAL), adding an additional measurement to said set of available measurements and repeating said step (g); wherein said additional measurement is selected from the group consisting of: {GPS measurement, GLONASS measurement, GALILEO measurement, a baro measurement, a clock measurement, and a pseudolite measurement}; and (i) if said horizontal protection level (HPL) is greater than said horizontal alert limit (HAL), and/or if said vertical protection level (VPL) is greater than said vertical alert limit (VAL), and if no additional measurement is available to add to said set of available measurements, declaring a receiver autonomous integrity monitoring (RAIM) detection function as not available and declaring said set of available measurements as not substantially sufficient.

4. The method of claim 3, wherein said step (g) of declaring said receiver autonomous integrity monitoring (RAIM) detection function available based on said available set of measurements and declaring said available set of measurements as substantially sufficient further includes the steps of:

(k) if said number of available navigational measurements is greater than or equal to a second predetermined number, for each timing cycle of said satellite receiver, continuously computing a horizontal exclusion level (HEL) and continuously computing a vertical exclusion level (VEL) associated with said effective configuration of real time measurement geometry adjusted for said normalized weights factor; and (l) if said number of available navigational measurements is less than said second predetermined number, for each timing cycle of said satellite receiver adding an additional measurement to said set of available measurements and repeating said step k; wherein said additional measurement is selected from the group consisting of: {GPS measurement, GLONASS measurement, GALILEO measurement, a baro measurement, a clock measurement, and a pseudolite measurement}.

5. The method of claim 4, wherein said step (k) of continuously computing said horizontal exclusion level (HEL) and continuously computing said vertical exclusion level (VEL) further includes the steps of:

(k1) computing said horizontal exclusion level (HEL) by using a prior two-dimensional horizontal plane data obtained in said step (e) of checking whether said horizontal protection level (HPL) is less than or equal to said horizontal alert limit (HAL);

(k2) computing said vertical exclusion level (VEL) by using a prior one-dimensional vertical data obtained in said step (e) of checking whether said vertical protection level (VPL) is less than or equal to said vertical alert limit (VAL);

(k3) if said horizontal exclusion level (HEL) is less than or equal to said horizontal alert limit (HAL), and/or if said vertical exclusion level (VEL) is less than or equal to said vertical alert limit (VAL); declaring said RAIM fault exclusion function available;

(k4) if said horizontal exclusion level (HEL) is greater than said horizontal alert limit (HAL), and/or if said vertical exclusion level (VEL) is greater than said vertical alert limit (VAL); adding an additional measurement to said set of available measurements; and repeating said steps (k1–k3); wherein said additional measurement is selected from the group consisting of: {GPS measurement, GLONASS measurement, GALILEO measurement, a baro measurement, a clock measurement, and a pseudolite measurement}; and (k5) if said horizontal exclusion level (HEL) is greater than said horizontal alert limit (HAL), and/or if said vertical exclusion level (VEL) is greater than said vertical alert limit (VAL), and if no additional measurement is available, declaring said RAIM fault exclusion function not available.

6. The method of claim 5, wherein said step (k1) of computing said horizontal exclusion level (HEL) by using said prior data obtained in said step (e) further includes the steps of:

(k1, 1) computing said horizontal exclusion level (HEL) by excluding one measurement at a time from said available set of measurements;

(k1, 2) calculating a horizontal protection level ($HPL_k$) for each said subset of measurements obtained from said available set of measurements with one excluded measurement; and (k1, 3) maximizing said ($HPL_k$) over all 'k' values; 'k' is an integer less than or equal to the number of available measurements.

7. The method of claim 5, wherein said step (k2) of computing said vertical exclusion level (VEL) by using said prior data obtained in said step (e) further includes the steps of:

(k2, 1) computing said vertical exclusion level (VEL) by excluding one measurement at a time from said available set of measurements;

(k2, 2) calculating a vertical protection level ($VPL_i$) for each said subset of measurements obtained from said available set of measurements with one excluded measurement; and (f2, 3) maximizing said ($VPL_i$) over all 'i' values; 'i' is an integer less than or equal to the number of available measurements.

8. A method for a satellite receiver autonomous integrity monitoring (RAIM) real time fault detection and exclusion implementation by performing at least one re-initialization cycle; said method comprising the steps of:

(a) identifying a default set of navigational measurements using a real time available GPS satellite constellation, and acquiring a plurality of GPS satellite signals by using a satellite receiver;

(b) performing a re-initialization cycle of said satellite receiver by computing and storing in a HEL/VEL database a plurality of HEL values and a plurality of VEL values for at least two consecutive timing cycles; each said HEL value corresponding to one said timing cycle; each said VEL value corresponding to one said timing cycle;

(c) determining and storing in said HEL/VEL database the difference between one said HEL value and a selected threshold HAL for each said re-initialization cycle; and (d) determining and storing in said HEL/VEL database the difference between one said VEL value and a selected threshold VAL for each said re-initialization cycle.

9. The method of claim 8 further including the steps of:
if said default set of measurements has been updated to include an updated set of measurements by adding or eliminating at least one measurement selected from the group consisting of: {GPS measurement, GLONASS measurement, GALILEO measurement, a baro measurement, a clock measurement, and a pseudolite measurement};

(e) computing and storing in said HEL/VEL database a plurality of updated HEL values and a plurality of updated VEL values corresponding to said updated set of measurements for at least two consecutive timing cycles; each said updated HEL value corresponding to one said timing cycle; each said updated VEL value corresponding to one said timing cycle;

(f) determining and storing in said HEL/VEL database the difference between one said updated HEL value and a selected threshold HAL for each said re-initialization cycle; and (g) determining and storing in said HEL/VEL database the difference between one said updated VEL value and a selected threshold VAL for each said re-initialization cycle.

10. The method of claim 8 further including the steps of:
if said user dynamics exceed a pre-determined dynamics, or if said user is pre-selecting a high dynamics option;

(e) computing and storing in said HEL/VEL database a plurality of updated HEL values and a plurality of updated VEL values corresponding to said high dynamics option for at least two consecutive timing cycles; each said updated HEL value corresponding to one said timing cycle; each said updated VEL value corresponding to one said timing cycle;

(f) determining and storing in said HEL/VEL database the difference between one said updated HEL value and a selected threshold HAL for each said re-initialization cycle; and (g) determining and storing in said HEL/VEL database the difference between one said updated VEL value and a selected threshold VAL for each said re-initialization cycle.

11. The method of claim 8 further including the steps of:

if a plurality of last stored HEL/VEL values includes a plurality of 'old' HEL/VEL values, that is if each said 'old' HEL value was updated at least at an absolute timing coordinate greater than a predetermined timing coordinate, and/or if each said 'old' VEL value was updated at least at an absolute timing coordinate greater than said predetermined timing coordinate;

(e) computing and storing in said HEL/VEL database a plurality of updated HEL values and a plurality of updated VEL values for at least two consecutive timing cycles; each said updated HEL value corresponding to one said timing cycle; each said updated VEL value corresponding to one said timing cycle;

(f) determining and storing in said HEL/VEL database the difference between one said updated HEL value and a selected threshold HAL for each said re-initialization cycle; and (g) determining and storing in said HEL/VEL database the difference between one said updated VEL value and a selected threshold VAL for each said re-initialization cycle.

12. The method of claim 8 further including the steps of:

if a plurality of last computed HEL/VEL values includes a plurality of HEL values and a plurality of VEL values, and at least one said last computed HEL value is greater than or equal to a selected threshold HAL; and/or at least one said last computed VEL value is greater than or equal to a selected threshold VAL;

(e) computing and storing in said HEL/VEL database a plurality of updated HEL values and a plurality of updated VEL values for at least two consecutive timing cycles; each said updated HEL value corresponding to one said timing cycle; each said updated VEL value corresponding to one said timing cycle;

(f) determining and storing in said HEL/VEL database the difference between one said updated HEL value and a selected threshold HAL for each said re-initialization cycle; and (g) determining and storing in said HEL/VEL database the difference between one said updated VEL value and a selected threshold VAL for each said re-initialization cycle.

13. The method of claim 8 further including the step of:

if a plurality of last computed HEL/VEL values includes a plurality of HEL values and a plurality of VEL values computed at a prior timing cycle;

executing the process of prediction of a plurality of predicted HEL/VEL values based on said HEL/VEL database, wherein each said predicted HEL value is extrapolated from at least two said prior HEL values stored in said HEL/VEL database; wherein each said predicted VEL value is extrapolated from at least two said prior VEL values stored in said HEL/VEL database.

14. The method of claim 13, wherein said step of executing the process of prediction of said plurality of predicted HEL/VEL values further includes the steps of:

extrapolating each said predicted HEL value from at least two said prior HEL values stored in said HEL/VEL database by using a linear extrapolation; and extrapolating each said predicted VEL value from at least two said prior VEL values stored in said HEL/VEL database by using said linear extrapolation.

15. The method of claim 13, wherein said step of executing the process of prediction of said plurality of predicted HEL/VEL values further includes the steps of:

extrapolating each said predicted HEL value from at least two said prior HEL values stored in said HEL/VEL database by using a cubic extrapolation; and extrapolating each said predicted VEL value from at least two said prior VEL values stored in said HEL/VEL database by using said cubic extrapolation.

16. The method of claim 13, wherein said step of executing the process of prediction of said plurality of predicted HEL/VEL values further includes the steps of:

extrapolating each said predicted HEL value from at least two said prior HEL values stored in said HEL/VEL database by using a spline prediction method; and extrapolating each said predicted VEL value from at least two said prior HEL values stored in said HEL/VEL database by using said spline prediction method.

17. The method of claim 13, wherein said step of executing the process of prediction of said plurality of predicted HEL/VEL values further includes the steps of:

extrapolating each said predicted HEL value from at least two said prior HEL values stored in said HEL/VEL database by using a fuzzy logic method; and extrapolating each said predicted VEL value from at least two said prior HEL values stored in said HEL/VEL database by using said fuzzy logic method.

18. The method of claim 13 further including the steps of:

if a plurality of predicted HEL/VEL values includes a plurality of HEL values and a plurality of VEL values, and if each said predicted HEL is greater than or within a selected interval around a predetermined HAL; and/or if each said predicted VEL is greater than or within said selected interval around a predetermined VAL;

computing and storing in said HEL/VEL database a plurality of updated HEL values and a plurality of updated VEL values for at least two consecutive timing cycles; each said updated HEL value corresponding to one said timing cycle; each said updated VEL value corresponding to one said timing cycle;

determining and storing in said HEL/VEL database the difference between one said updated HEL value and a selected threshold HAL for each said re-initialization cycle; and determining and storing in said HEL/VEL database the difference between one said updated VEL value and a selected threshold VAL for each said re-initialization cycle.

* * * * *